2 Sheets—Sheet 1.

T. A. HILL.
GRAIN-DRILL.

No. 174,242. Patented Feb. 29, 1876.

WITNESSES:
W. W. Hollingsworth
Solon C. Kemon

INVENTOR:
Truman A. Hill
BY
ATTORNEYS.

2 Sheets—Sheet 2.

T. A. HILL.
GRAIN-DRILL.

No. 174,242. Patented Feb. 29, 1876.

WITNESSES:
W. W. Hollingsworth
Solon C. Kemon

INVENTOR:
Truman A. Hill
BY
Munn & Co.
ATTORNEYS.

N. PETERS, PHOTO-LITHOGRAPHER, WASHINGTON, D. C.

UNITED STATES PATENT OFFICE.

TRUMAN A. HILL, OF JEFFERSON CITY, MISSOURI, ASSINGNOR TO HIMSELF AND JOSEPH H. BODINE, OF SAME PLACE.

IMPROVEMENT IN GRAIN-DRILLS.

Specification forming part of Letters Patent No. 174,242, dated February 29, 1876; application filed May 20, 1875.

*To all whom it may concern:*

Be it known that I, TRUMAN A. HILL, of Jefferson City, in the county of Cole and State of Missouri, have invented a new and Improved Grain-Drill; and I do hereby declare that the following is a full, clear, and exact description of the same, reference being had to the accompanying drawing, forming a part of this specification, in which—

Figure 1:
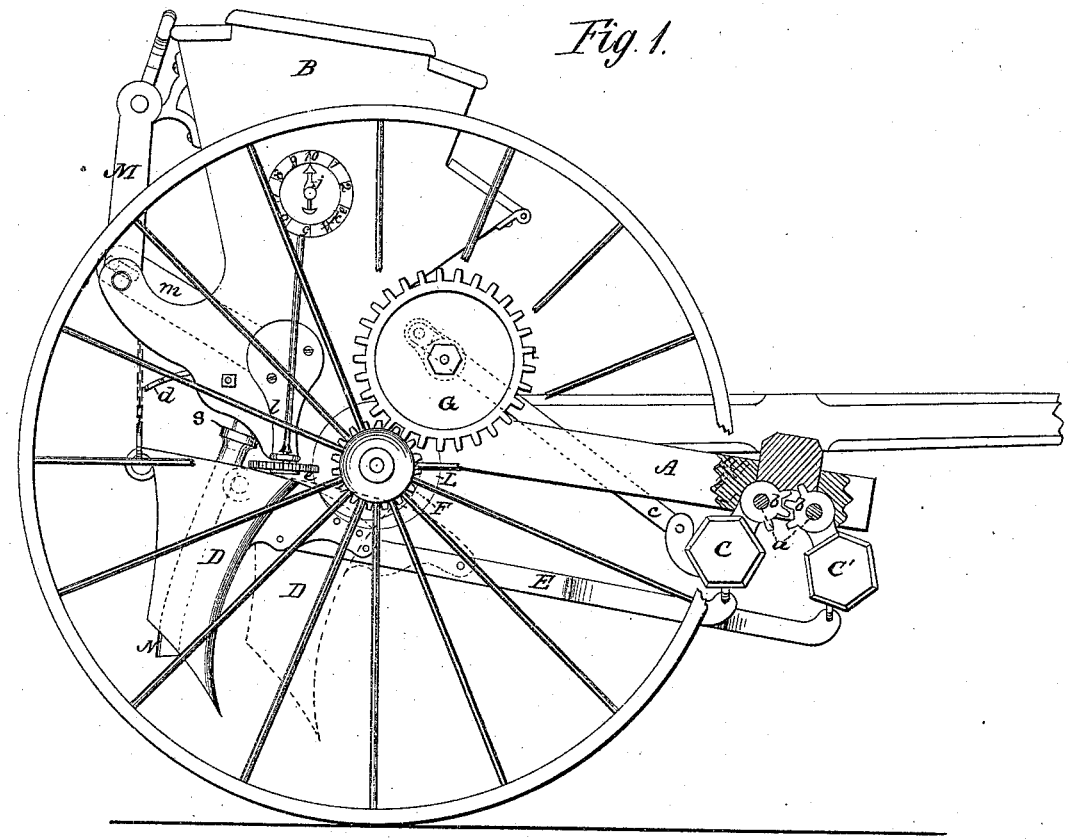
Figure 2:
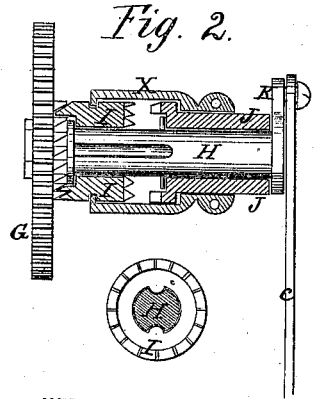
Figure 4:
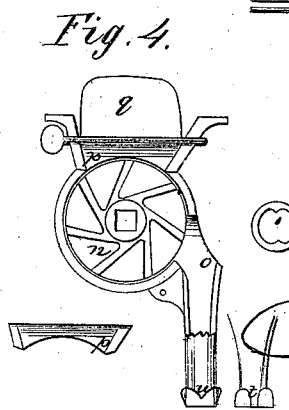
Figure 3:
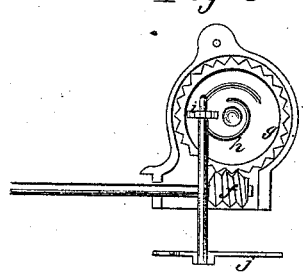
Figure 5:
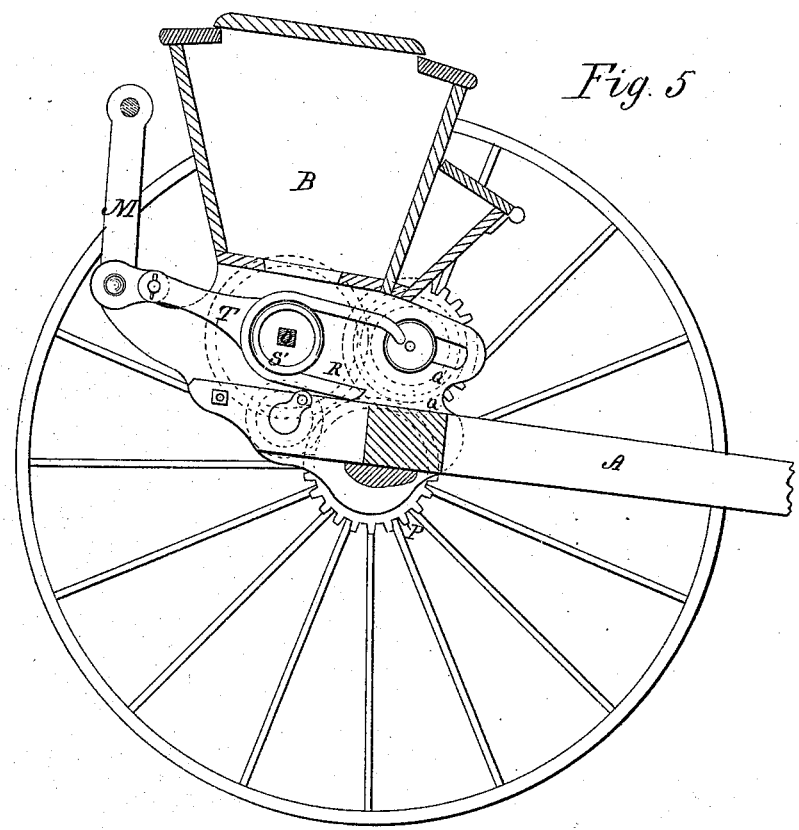
Figure 6:
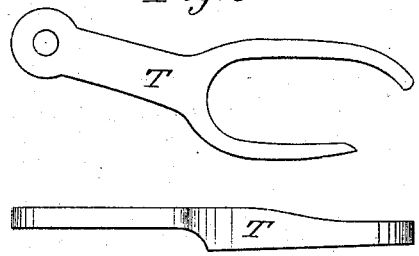
Figure 7:
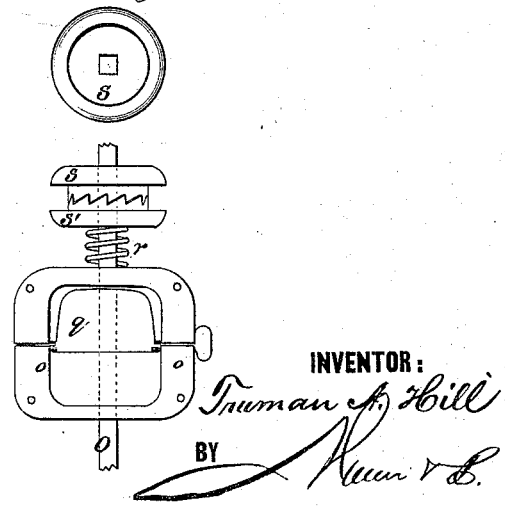

Figure 1 is a vertical side elevation with parts broken away; Fig. 2 are sectional details of the clutch for the rock-bars; Fig. 3, detail of the registering device; Fig. 4, detail of the seeding devices; Fig. 5, a transverse vertical section of the drill; Fig. 6, details of the bifurcated wedge; Fig. 7, details of seed-wheel clutch.

This invention relates to certain improvements in grain-drills; and it consists in such a peculiar construction and arrangement of parts as will first be fully described, and then pointed out in the claims.

In the drawing, A represents the main frame, and B the grain-box, of the drill. C C' are the two rock-bars, which are connected with the suspended spouts D by connecting-rods E, one-half of the said spouts being connected with the bar C, and the alternating ones with the bar C'. Said bars are pivoted at $a$ to the main frame, and are provided with toothed segments $b$, which mesh, so that a rocking motion, imparted through pitman $c$ to one of the bars, causes them to oscillate in opposite directions and the alternating spouts to be reciprocated accordingly. The object of this movement of the spouts is to clear the line of seeding from clods and make the drilling uniform. F is a cog-wheel upon the shaft of the main driving-wheels, which meshes with a cog-wheel, G. Said wheel is loosely journaled upon a short shaft, H, but is adapted to carry the said shaft with it in its revolution by reason of the double clutch I, which gears with a clutch on the wheel, and is connected with shaft H through a groove and spline. Said clutch is operated from the rear by a lever, $d$, attached to a sliding collar, X, and is made double, so that when it breaks the connection with the wheel it locks the shaft H with the toothed bearing J, to prevent the revolution of the shaft and the communication of motion through the crank K to the pitman $c$ and the spouts. L is a worm upon the shaft of one of the driving-wheels, which turns the pinion $e$ of a vertical shaft, carrying at its upper end a worm, $f$. This worm meshes with a cog-wheel, $g$, which has a worm, $h$, and this in turn revolves a pinion, $i$, upon the shaft which carries the index-hand $j$ around the graduated dial-face $k$. By this arrangement the revolution of the main wheels is recorded in a greatly diminished proportion and the length of the drill being known, the amount of ground seeded may be ascertained. The pinion $e$ is arranged in a movable bearing, $l$, which is provided with an arm, $m$. This arm is attached to and moves with a crank-bar, M, to which the spouts are suspended, so that whenever the bar is raised to elevate the spouts when the machine is not seeding, the pinion $e$ is removed from the worm on the axle of one of the driving-wheels, and the registration of the revolutions of the latter is stopped.

In the bottom of the grain-box B are arranged the seeding devices, which consist of a series of wheels, $n$, having side recesses and revolving upon a squared shaft which passes through all of the wheels. Said wheels are contained in a casing, $o$, which forms a circular channel for the passage of the grain from the grain-box to the elastic pipes N that carry the grain to the spouts. Just above the wheel $n$ is placed a casting, $p$, which, with a pivoted gate or cut-off, $q$, makes two separate channels for the different sizes of grain, either one of which channels may be readily closed by turning the said cut-off across the mouth of the same.

The elastic pipes N are each provided with a ring, $s$, with inwardly-projecting lugs, and the discharge of the seeding devices is constructed with open grooves $t$ and depressed seats $u$, which grooves receive the lugs of the ring when the coupling is made, and the seats hold the same when turned to prevent the pipe from coming off.

O is the shaft actuating the seed-wheels $n$, which is rotated by the following mechanism: A cog-wheel, P, on the main shaft drives the wheels Q Q', of which Q' meshes with and rotates a wheel, R. To the shaft of this wheel is rigidly attached a clutch, S, with which engages a loose clutch, S', upon the shaft O to couple the shaft with the actuating mechanism.

The said loose clutch is habitually held against S by a spiral spring, r, and is disengaged from the same by a forked or bifurcated wedge, T, which is pivoted to the crank-bar M, and effects the disengagement of the clutch whenever the said bar is raised to stop the seeding. In the front of the grain-box is a grass-seeder, having the usual perforation and the reciprocating bar in the bottom thereof, the bar being operated by a connecting-rod and a pinion meshing with the main-shaft wheel.

To prevent the accumulation of dirt upon the gearing at the ends of the box, and the consequent obstruction of the operation of the machine, detachable cases are arranged to slide over and cover the same.

Having thus described my invention, what I claim as new is—

1. The combination of the wheel G, the grooved shaft H, the double clutch I, having inner studs, the collar X, lever d, crank K, and pitman E, with the rock-bars C C', attached to the spouts, as and for the purpose described.

2. The combination, with the crank-bar M, of the arm m, the pinion e and registering devices, and the movable bearing l, substantially as and for the purpose described.

3. The combination with the wheel n, having side recesses, of the casing o, piece p, and pivoted cut-off q, substantially as and for the purpose described.

4. The wheel R, actuated through a gearing by the driving-wheels, and having a clutch, S, in combination with the loose clutch S' upon the shaft O, the spring r, and the forked wedge T, substantially as and for the purpose described.

5. The combination of the elastic pipe, provided with ring s, having inwardly-projecting lugs, and the discharge of the seeding devices, having grooves t, and depressed seats u, as and for the purpose specified.

TRUMAN A. HILL.

Witnesses:
DAVID JAMIESON,
FREDERICK ROETZER.